United States Patent
Axmon et al.

(10) Patent No.: US 10,111,152 B2
(45) Date of Patent: Oct. 23, 2018

(54) CELL SELECTION FOR AIRBORNE MOBILE CELLULAR COMMUNICATIONS EQUIPMENT

(71) Applicant: Telefonaktiebolaget L M Ericsson (publ), Stockholm (SE)

(72) Inventors: Joakim Axmon, Kavlinge (SE); Peter Alriksson, Horby (SE); Bengt Lindoff, Bjarred (SE); Bjorn Ekelund, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/963,398

(22) Filed: Dec. 9, 2015

(65) Prior Publication Data

US 2017/0171792 A1    Jun. 15, 2017

(51) Int. Cl.
*H04W 36/32* (2009.01)
*H04W 84/00* (2009.01)
(Continued)

(52) U.S. Cl.
CPC ........ *H04W 36/32* (2013.01); *H04B 7/18506* (2013.01); *H04W 16/28* (2013.01);
(Continued)

(58) Field of Classification Search
CPC ............ H04B 7/18506; H04W 84/005; H04W 16/28; H04W 84/06; H04W 36/32;
(Continued)

(56) References Cited

U.S. PATENT DOCUMENTS 5,678,184 A * 10/1997 Cutler, Jr. .......... H04B 7/18541
455/13.1
6,047,183 A * 4/2000 Kingdon ............... H04W 36/32
342/450
(Continued)

FOREIGN PATENT DOCUMENTS

CN    103873133 A    6/2014
CN    204103537 U    1/2015
(Continued)

OTHER PUBLICATIONS

Nijsure, Yogesh A et. al, Adaptive Air-to-Ground SEcure Communication System based on ADS-B and Wide-Area Multilateration. IEEE Transactions on Vehicular Technology Aug. 2015.*
(Continued)

*Primary Examiner* — George Eng
*Assistant Examiner* — Umair Ahsan
(74) *Attorney, Agent, or Firm* — Leffler Intellectual Property Law, PLLC; Kenneth B. Leffler

(57) ABSTRACT

A network node in a cellular telecommunications system hands over responsibility for serving a wireless communication equipment from a serving cell to a target cell, wherein the wireless communication equipment is situated in a first aircraft that is in-flight. An aircraft position, an aircraft velocity, and an aircraft direction are determined. For each candidate cell of a number of candidate cells, a level of beam distortion that would result from a beam directed from the candidate cell to the first aircraft is predicted. The target cell is selected from the candidate cells by identifying which of the candidate cells has a least amount of predicted beam distortion. The target cell is then signaled to prepare for a handover of responsibility for serving the wireless communication equipment.

15 Claims, 10 Drawing Sheets

(51) Int. Cl.
- *H04W 16/28* (2009.01)
- *H04W 36/08* (2009.01)
- *H04W 36/30* (2009.01)
- *H04B 7/185* (2006.01)
- *H04W 84/06* (2009.01)

(52) U.S. Cl.
CPC ............ *H04W 36/08* (2013.01); *H04W 36/30* (2013.01); *H04W 84/005* (2013.01); *H04W 84/06* (2013.01)

(58) Field of Classification Search
CPC ..... H04W 88/08; H04W 16/30; H04W 24/02; H04W 36/08; H04W 36/18; H04W 36/20; H04W 36/30; H04W 4/02; H04W 4/028; H04W 4/046
See application file for complete search history.

(56) References Cited

U.S. PATENT DOCUMENTS

| | | | |
|---|---|---|---|
| 8,688,101 | B1 | 4/2014 | Hayes et al. |
| 8,825,033 | B1 | 9/2014 | Hayes et al. |
| 8,868,069 | B2 | 10/2014 | Bennett et al. |
| 8,914,022 | B2 | 12/2014 | Kostanic et al. |
| 9,008,669 | B2 | 4/2015 | Hyslop et al. |
| 2006/0030311 | A1* | 2/2006 | Cruz ............... H01Q 1/246 455/431 |
| 2006/0229077 | A1 | 10/2006 | Monk |
| 2006/0239238 | A1* | 10/2006 | Fernandez-Corbaton ............... H04B 7/01 370/342 |
| 2008/0154448 | A1* | 6/2008 | Mead .............. G06Q 50/00 701/14 |
| 2009/0186611 | A1 | 7/2009 | Stiles et al. |
| 2012/0021740 | A1* | 1/2012 | Vaidyanathan ...... G08G 5/0013 455/431 |
| 2012/0063522 | A1 | 3/2012 | Fuss et al. |
| 2012/0289233 | A1* | 11/2012 | Medbo ............. H04W 36/32 455/436 |
| 2013/0044611 | A1 | 2/2013 | Jalali et al. |
| 2013/0196670 | A1* | 8/2013 | Kim ............... H04W 36/0083 455/440 |
| 2013/0324070 | A1 | 12/2013 | Bennett et al. |
| 2014/0266896 | A1 | 9/2014 | Hyslop |
| 2017/0111771 | A1* | 4/2017 | Haque ............... H04W 4/046 |
| 2017/0127332 | A1 | 5/2017 | Axmon et al. |

FOREIGN PATENT DOCUMENTS

| | | |
|---|---|---|
| EP | 1976152 A1 | 10/2008 |
| EP | 2278732 A2 | 1/2011 |
| WO | 2013010370 A1 | 1/2013 |
| WO | 20140110427 A1 | 7/2014 |

OTHER PUBLICATIONS

Yogesh Anil Nijsure et al., Adaptive Air-to-Ground Secure Communication System Based on ADS-B and Wide-Area Multilateration, IEEE Transactions on Vehicular Technilogy, 17 pages.

ETSI TR 103 054 V1.1.1 (Jul. 2010), Electromagnetic compatibility and Radio spectrum Matters (ERM); System Reference Document; Broadband Direct-Air-to-Ground Communications operating in part of the frequency range from 790 MHz to 5 150 MHz, 23 pages.

ETSI RT 103 108 V1.1.1 (Jul. 2013), Electromagnetic compatibility and Radio spectrum Matters (ERM); System Reference document (SRdoc); Broadband Direct-Air-to-Ground Communications System operating in the 5,855 GHz to 5,875 GHz band using 3G technology, 25 pages.

ETSI TR 101 599 V1.1.3 (Sep. 2012), Electromagnetic compatibility and Radio spectrum matters (ERM) System Reference Document (SRDoc); Broadband Direct-Air-to-Ground Communications System employing beamforming antennas, operating in the 2,4 GHz and 5,8 GHz bands, 31 pages.

PCT International Search Report, dated Feb. 13, 2017, in connection with International Application No. PCT/EP2016/080480, all pages.

PCT Written Opinion, dated Feb. 13, 2017, in connection with International Application No. PCT/EP2016/080480, all pages.

Omar Altradt et al., Intra-frequency Handover Algorithm Design in LTE Networks Using Doppler Frequency Estimation, 2012 IEEE Globecom Workshops, Anaheim, CA, USA, Dec. 3-7, 2012, pp. 1172-1177.

Omar Altrad et al, Doppler frequency estimation-based handover algorithm for long-term evolution networks, The Institution of Engineering and Technology 2014, IET Netw., vol. 3, Iss. 2, Jun. 1, 2014, pp. 88-96.

C. Tepedelenlioglu et al., Estimation of Doppler spread and signal strength in mobile communications with applications to handoff and adaptive transmission, Wireless Communications and Mobile Computing, 2001, pp. 221-242.

* cited by examiner

CELL SELECTION FOR AIRBORNE MOBILE CELLULAR COMMUNICATIONS EQUIPMENT

BACKGROUND

The present invention relates to connectivity between land-based cellular communications systems and mobile cellular communications equipment located in air-borne craft, and more particular to cell selection by mobile cellular communications equipment while airborne.

The world is becoming more and more connected, and this has led consumers to have increasing expectations of being able to be online and experience at least moderate data rates regardless of time and location. As one response to these expectations, the next generation of mobile technology, the so-called IMT-2020 (5G), targets high-speed mobility as one objective. The exemplary scenarios studied are high-speed trains and vehicles on freeways, but following the recent trend, it is expected that terrestrial in-flight broadband service for airplanes will be in the scope—either as direct communication between the User Equipment (UE) and base station, or via an access point (AP) onboard the aircraft which aggregates the traffic of some number of UEs and maintains a link to the base station.

In 2013 the Federal Communications Commission (FCC) took steps towards enabling better connectivity by assigning a 500 MHz wide subband in the 14 GHz radiofrequency (RF) band for in-flight air-to-ground broadband connection. The FCC's expectation is that by year 2021 there will be a demand for 15000 flights offering high-speed broadband connectivity to its passengers. By comparison, the availability in year 2013 was 3000 airplanes world-wide, and this was with connections that were deemed too slow and by far too expensive by consumers. The industry has noted that today's airline passengers expect the same level of broadband service that is available on the ground.

Several trials have been carried out offering terrestrial network coverage in lower frequency bands typically used for regular cellular networks. Recent advances on the regulatory side of aviation will, if properly exploited, greatly enhance and simplify in-flight broadband services that are based on terrestrial networks.

The principles for maintaining coverage for mobile communication equipment on the ground are well known. So-called radio base stations are deployed at various geographical positions, and for a given mobile communication equipment, a "best-suited" base station is selected as the point of connection into the communications system. As the mobile communication equipment changes its position, the quality of its radio connection with the serving base station may deteriorate to the extent that a reselection is made, whereby a better-suited base station takes over as the serving base station.

It can be seen that in conventional telecommunications systems, which focus on communication with mobile devices on the ground, the deployment of base stations is designed to provide single macro cell coverage at each geographical position (except, of course, at cell edges where handovers of service occur from one base station to another). In order to achieve cost efficient communication with communication equipment aboard aircraft in the sky, it is desirable to reuse the macro grid of existing telecommunications systems for that communication. However, such reuse is not a straightforward matter because the existing strategies used for cell selection and reselection by mobile equipment on the ground are not useful when that equipment is airborne. The reason is that cell selection on the ground relies substantially on signal measurements related to path loss, and on the ground this is essentially related to geography because, for example, buildings and terrain make it a richly scattering environment. In most circumstances, the best-suited macro cell for equipment on the ground will be the one that the mobile communications equipment is physically closest to.

But in the air, line of sight (LoS) conditions prevail—there are essentially no surrounding scatterers—and as a result the signals received from a number of base stations all have approximately the same path loss. Thus, the signal measurements and strategies that are typically used for cell selection/reselection in existing systems are not useful when applied to airborne equipment.

Hence there is a need for technology that allows airborne mobile communication equipment to select/reselect a serving cell from among a number of potential base stations deployed on the ground at geographically diverse locations.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology that hands over responsibility for serving a wireless communication equipment from a serving cell to a target cell in a cellular telecommunications system, wherein the wireless communication equipment is situated in a first aircraft that is in-flight. This involves determining an aircraft position, an aircraft velocity, and an aircraft direction. For each candidate cell of a plurality of candidate cells, a prediction is made regarding a level of beam distortion through the handover that would result from a beam directed from the candidate cell to the first aircraft. The target cell is selected from the plurality of candidate cells by identifying which of the plurality of candidate cells has a least amount of predicted beam distortion through the handover. The target cell is signaled to prepare for a handover of responsibility for serving the wireless communication equipment.

In an aspect of some but not necessarily all embodiments, determining the aircraft position, the aircraft velocity, and the aircraft direction comprises periodically acquiring, via an aircraft navigation broadcast receiver, acquired navigation information transmitted from the first aircraft, wherein the acquired navigation information comprises the position of the first aircraft, an altitude of the first aircraft, and a time value indicating when the position of the first aircraft was determined. The velocity and the direction are determined from the periodically acquired navigation information.

In an aspect of some but not necessarily all embodiments, predicting the level of beam distortion that would result from the beam directed from the candidate cell to the first aircraft comprises predicting a level of Doppler shift that would result from the beam directed from the candidate cell to the first aircraft.

In an aspect of some but not necessarily all embodiments, selecting the target cell from the plurality of candidate cells by identifying which of the plurality of candidate cells has the least amount of predicted beam distortion through the handover comprises stabilizing Doppler shift through the handover.

In an aspect of some but not necessarily all embodiments, predicting the level of beam distortion through the handover that would result from the beam directed from the candidate cell to the first aircraft comprises predicting for a given future moment in time, a beam angle between a first vector representing the trajectory of the first aircraft and a second vector between the first aircraft and a candidate cell antenna, wherein the first and second vectors are vectors in a Euclidean three-dimensional space. Further, selecting the target cell from the plurality of candidate cells by identifying which of the plurality of candidate cells has the least amount of predicted beam distortion through the handover comprises determining which of the candidate cells has the beam angle that is closest to being normal to the first aircraft direction.

In an aspect of some but not necessarily all embodiments, predicting the level of beam distortion through the handover that would result from the beam directed from the candidate cell to the first aircraft comprises predicting for a given future moment in time, a beam angle between a first vector representing the trajectory of the first aircraft and a second vector between the first aircraft and a candidate cell antenna, wherein the first and second vectors are vectors in a Euclidean three-dimensional space. Further, selecting the target cell from the plurality of candidate cells by identifying which of the plurality of candidate cells has the least amount of predicted beam distortion through the handover comprises determining which of the candidate cells has the beam angle that is closest to being tangential to the first aircraft direction.

In an aspect of some but not necessarily all embodiments, predicting the level of beam distortion through the handover that would result from the beam directed from the candidate cell to the first aircraft comprises predicting for a given future moment in time, a first angle between a first vector representing the trajectory of the first aircraft and a second vector between the first aircraft and a serving cell antenna; and predicting for the given future moment in time, a second angle between the first vector representing the trajectory of the first aircraft and a third vector between the first aircraft and a candidate cell antenna, wherein the first, second, and third vectors are vectors in a Euclidean three-dimensional space. Further, selecting the target cell from the plurality of candidate cells by identifying which of the plurality of candidate cells has the least amount of predicted beam distortion through the handover comprises identifying which of the plurality of candidate cells has the second angle that is most like the first angle.

In an aspect of some but not necessarily all embodiments, predicting the level of beam distortion through the handover that would result from the beam directed from the candidate cell to the first aircraft comprises predicting for a given future moment in time, an azimuth and direction of a beam from the candidate cell to the first aircraft, and predicting for the given future moment in time, an azimuth and direction of a beam from the candidate cell to a second aircraft having onboard wireless communication equipment in need of cellular communication system service. A degree of similarity is computed between the predicted azimuth and direction of the beam from the candidate cell to the first aircraft and the predicted azimuth and direction of the beam from the candidate cell to the second aircraft, and the degree of similarity is used as an indicator of the level of beam distortion.

In an aspect of some but not necessarily all embodiments, predicting the level of beam distortion through the handover that would result from the beam directed from the candidate cell to the first aircraft comprises predicting, for a future moment in time, that a second aircraft that is served by a cell other than the candidate cell will be coming into a coverage area of a beam from the candidate cell.

BRIEF DESCRIPTION OF THE DRAWINGS

The objects and advantages of the invention will be understood by reading the following detailed description in conjunction with the drawings in which.

DETAILED DESCRIPTION

Figure 1:
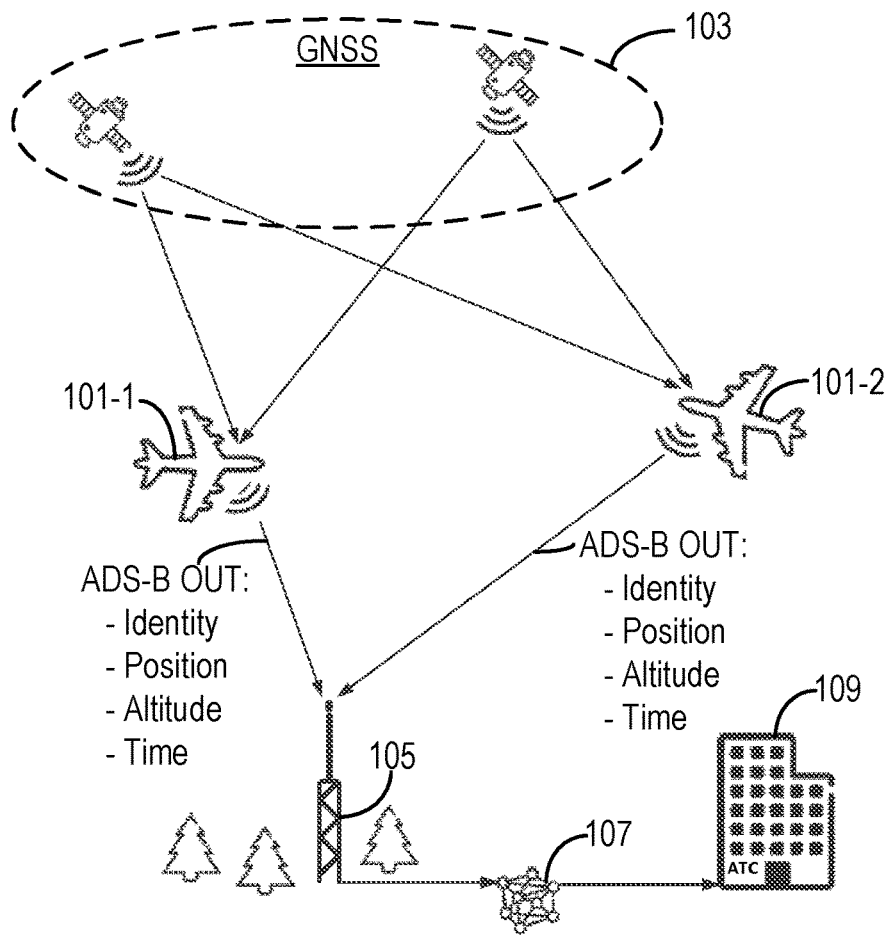
FIG. 1 illustrates an ADS-B deployment.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

Further, in some instances the description of embodiments may use the term "airplane". However, this is not intended to limit the invention in any way, and any such usage should be construed more broadly, for example as if the term "aircraft" (which encompasses not only airplanes, but other flying craft) had been used.

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in Long Term Evolution (LTE) deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

In an aspect of the technology described herein, it is observed that a new standard, called "Automatic Dependent Surveillance-Broadcast Out" (ADS-B OUT) has been or is on the way to being adopted in several parts of the world for the purpose of replacing Secondary Surveillance Radar (SSR) used by air traffic control (ATC). The existing system, SSR, is based on having a radar station ping an aircraft transponder (transmitter-responder) by which the transponder responds by sending information about the aircraft's identity, altitude, and the like. This allows ATC to track the aircraft and guide them to avoid collisions.

The newer system, ADS-B OUT, differs from SSR in that information is broadcast from the aircraft periodically, without first being triggered by a radar pulse. Information contained in the broadcast comprises (but is not limited to):

Aircraft identity and call sign
GPS-based position (latitude, longitude)
Altitude
GPS-based time at which position and altitude were determined Ground stations and proximal aircraft receive the broadcasts and relay them to the ATC facility that is responsible for that airspace. The system is less expensive than SSR since no radar stations are needed, and is up to 200 times more accurate, yielding a tolerance of 5.1 m with respect to position. The broadcast signals reach up to 280 km. The system can also be used when aircraft are taxiing on the ground.

The use of ADS-B OUT has already been mandated in Canadian and Australian airspaces, is mandated for use in European airspace for large aircraft starting in 2015 and for all aircraft starting in 2017, and is mandated for use in U.S. airspace starting in 2020. It is already mandated for some or all of the airways in Hong-Kong, Singapore, Vietnam, Taiwan, and Indonesia, and trials have been carried out in some countries such as South Korea and China. It is currently unclear when it will be mandated in the entire Asia-Pacific region, but although not mandatory the use of ADS-B is generally allowed. All major aircraft vendors now ship aircraft prepared with wiring for installment of ADS-B equipment and connection to the onboard flight navigation system and a certified Global Positioning System (GPS) receiver.

FIG. 1 illustrates an exemplary ADS-B deployment. Each airplane 101-1, 101-2 determines its position based on signals received from satellites that are part of a global navigation satellite system (GNSS), such as the United States' NAVSTAR GPS and the Russian GLONASS. Information indicating the airplane's identity, position, altitude and the time at which the coordinates were determined, is broadcast periodically and is received by a ground station 105 (and also by nearby airplanes). Once received by the ground station 105 the information is routed (e.g., through a communications network 107) to the ATC facility 109 responsible for that part of the airspace.

ADS-B OUT broadcasts can be received by aviation enthusiasts by using inexpensive equipment; a DVB-T USB dongle and open source software is all that is needed, at a cost of less than 20€. Professional grade ADS-B OUT receivers can be acquired for around 800€ including taxes. The rather inexpensive equipment has led to there being many ADS-B OUT receivers spread over the globe, and by sharing data with a server world-wide real-time tracking is possible. The most renowned service is Flightradar24, founded in Sweden and relying on 7000 volunteers internationally feeding received ADS-B OUT information to a centralized server. In short, receiving and decoding flight information is easily done and only requires inexpensive equipment. Identity, position and altitude can be determined for any airplane equipped with ADS-B OUT, which soon is to be a requirement in a large part of the global airspace.

In one aspect of embodiments consistent with the invention a network (NW) node controls a set of macro cells (identities) and is responsible for maintaining telecommunications service via a serving cell to at least one mobile communications device located in an airborne aircraft. When cell reselection will be required, a cell selection management unit that is part of, or otherwise associated with the network node determines which target cell the service should be handed over to, and informs the target cell to prepare for connecting to the at least one mobile communications device. The cell selection is made based on at least one of Direction, elevation, and speed of the mobile device (assumed to be the same as the direction, elevation, and speed of the aircraft in which the mobile device is situated)

The target cell positions

Other aircraft's connection to the target cell (and aircraft's direction, speed, and relative position to the target cell site).

In an aspect of some embodiments, the target cell is chosen such that the Doppler frequency shift between the mobile communication equipment and the serving cell is minimized (relative all possible target cells).

In another aspect of some embodiments, selection of the target cell is based on avoidance of resource conflicts (with respect to beams) with other devices in aircraft already served by the target cell.

These and other aspects will now be described in further detail.

Figure 2:
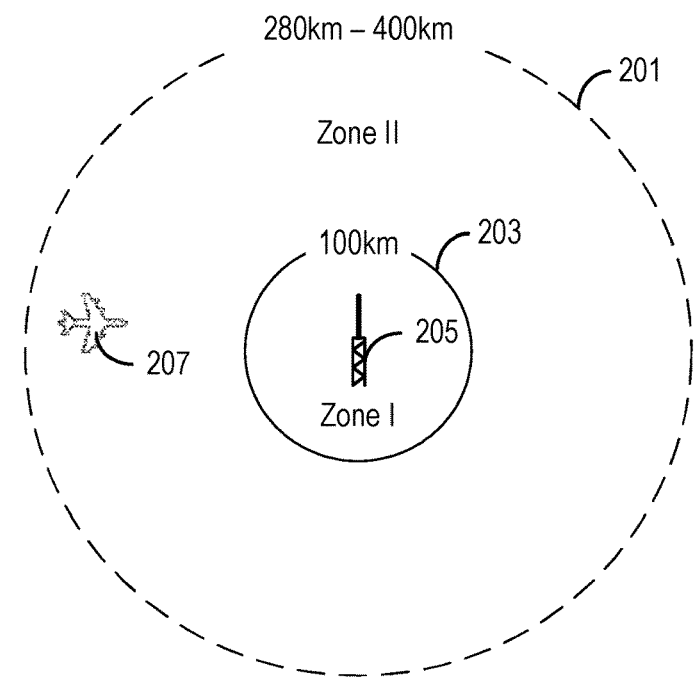
FIG. 2 illustrates the difference in coverage by an ADS-B broadcast and a 4G maximum cell size.

As mentioned above, embodiments utilize navigation information that is broadcast from aircraft, wherein the navigation information comprises an identity of the aircraft, a position of the aircraft, an altitude of the aircraft, and a time value (e.g., a GPS time value) indicating when the position of the aircraft was determined. Such broadcasts can be received up to some 280 to 400 km from the aircraft, thereby exceeding the maximum supported 4G cell radius of 100 km. Hence a base station (or another network node) can detect the aircraft well before it enters the area within which the base station (or other network node) can provide network coverage. FIG. 2 illustrates the difference in coverage by an ADS-B broadcast 201 (referred to herein as Zone I) and a 4G maximum cell size 203 (referred to herein as Zone II). A base station 205 in Zone I will be able to provide network coverage to an aircraft when it is within that zone 203. But that base station 205 will not be able to provide network coverage to an aircraft 207 that is not in Zone I but is elsewhere in Zone II. But because of the range of ADS-B OUT broadcasts, the base station 205 will receive the ADS-B broadcast from the aircraft 207, and can therefore determine whether the aircraft will enter Zone I and, if so, when.

Figure 3:
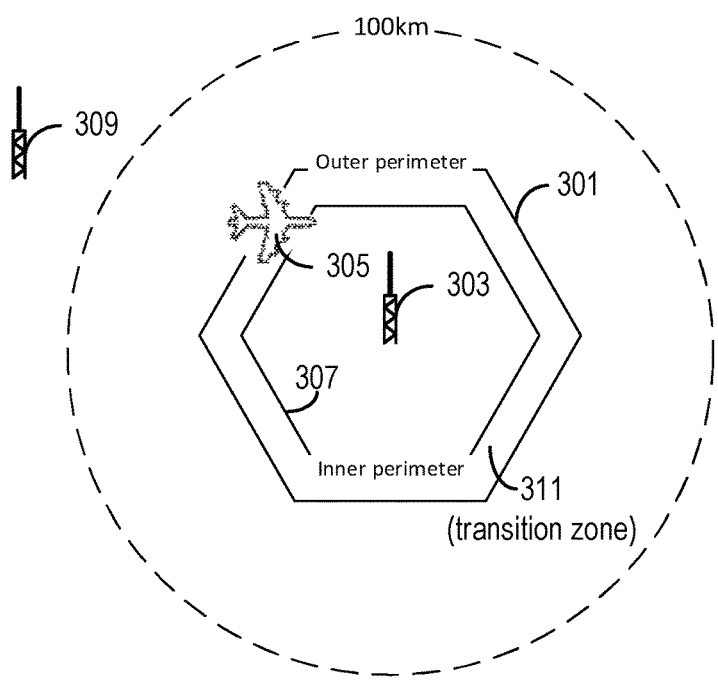
FIG. 3 illustrates an "outer perimeter"—the point at which a flight is considered to be entering (or alternatively, leaving) a network coverage area.

FIG. 3 illustrates what is herein referred to as an "outer perimeter" 301—the point at which a flight is considered to be entering (or alternatively, leaving) a network coverage area. The configuration of the outer perimeter 301 is a network deployment choice by the network operator, and is determined based on the intended coverage of the cell. Crossing the outer perimeter from outside the cell is associated with base station 303 (or other network node) actions such as directing uplink reception (ULRX) and downlink transmission (DLTX) beams towards the aircraft 303 and waiting for random access signaling from the aircraft 305. Crossing the outer perimeter 301 from inside to outside is associated with base station (or other network node) 303 actions such as turning off the beam.

There is also an inner perimeter 307, which, when crossed from inside the cell, triggers the base station (or other network node) 303 to take actions related to handover or handoff. In case there are one or more adjacent neighbor cells (e.g., a cell served by a second base station 309), the zone between the inner and outer perimeter (herein referred to as a transition zone, such as the transition zone 311 depicted in FIG. 3) is a zone where the handover should take place, hence the neighboring target cell should have a partially overlapping such zone.

Figure 4:
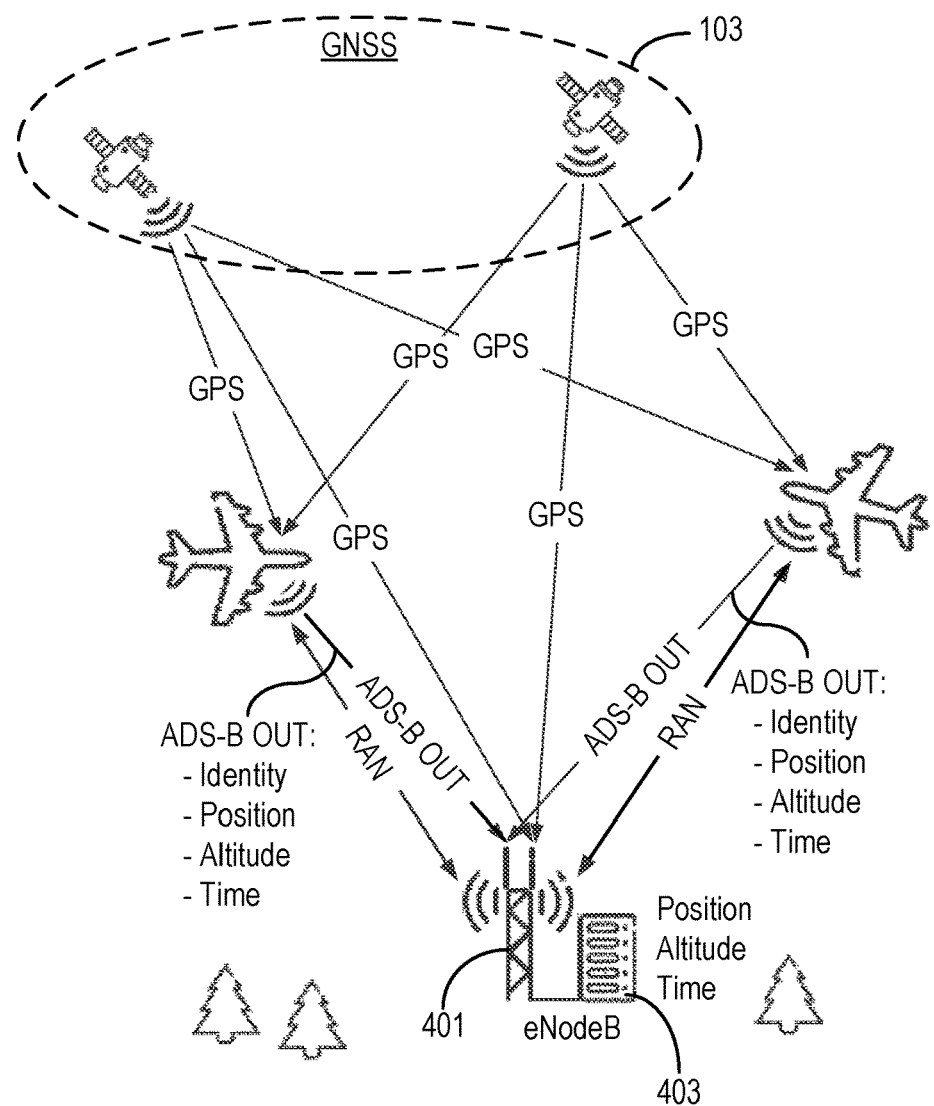
FIG. 4 illustrates a node's acquisition of aircraft position and altitude in accordance with an aspect of inventive embodiments.

An aspect of inventive embodiments regarding a node's acquisition of aircraft position and altitude is illustrated in FIG. 4. Each aircraft receives GPS (or comparable) time information from satellites that are part of a GNSS system 103 and use this information to determine altitude and position. This time, altitude, and position information is included in the ADS-B broadcast from each aircraft, and those broadcasts are received by a base station or comparable node (illustrated in the figure as an eNodeB 401). To enable this reception, the eNodeB 401 is configured to include an aircraft navigation broadcast receiver, which in this particular example, is an ADS-B OUT receiver 403. The eNodeB 401 is configured to additionally receive GPS time, altitude and position from the satellites of the GNSS system 103, and can therefore determine its own position relative to the aircraft. Today's macro cells generally already are configured to have GPS receivers for the purpose of controlling timing/frequency, so no extra requirement is imposed by the inventive aspects. As an alternative, the eNodeB's precise location can be determined at the time of installation, and this position information stored locally with the eNodeB 401. In the just-mentioned alternative, a different source (i.e., other than GPS) must be used as a timing/frequency reference for all components to control the macro cells' timing and frequency.

Figure 5:
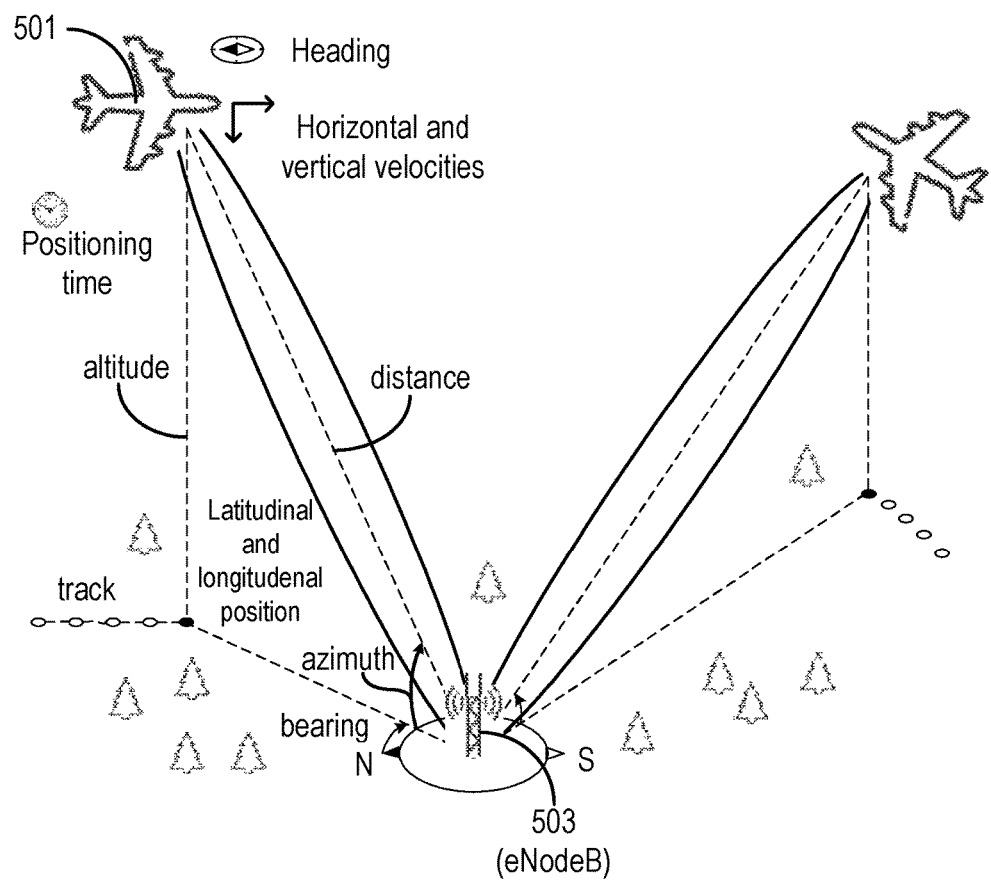
FIG. 5 illustrates navigational terminology used in connection with embodiments of the invention.

Using the position, altitude, and time stamp received from an aircraft via its ADS-B broadcasts, the base station (or another network node; e.g., eNodeB 401) can determine the azimuth, bearing and distance to the airplane. Using two or more ADS-B broadcasts (i.e., received at different times), the base station can determine the 3D course of the aircraft, for example as horizontal velocity, vertical velocity, and heading. In FIG. 5, these and other terms are illustrated for an aircraft 501 relative to an eNodeB 503. Knowing the difference in time between the several fixes of the altitude and position provided by the aircraft 501, and the current (or future) time, as acquired via the GPS receiver in the eNodeB 503, the eNodeB can predict the position of the aircraft 501 for the next few seconds. As it receives updated information via ADS-B (position is broadcast once or twice per second, depending on the underlying system), the eNodeB 503 adjusts its prediction model.

Using the predicted information on aircraft position and altitude, the base station directs at least one beam (main lobe) for downlink transmissions (DLTX) towards the aircraft, and at least one beam for uplink reception. The number of beams used may for instance depend on which transmission modes are to be supported in the cell.

Another consideration in communications between the base station and wireless communication equipment onboard the aircraft is the significant Doppler shift in both the uplink and downlink directions that result from the movement of the aircraft relative to the base station. The magnitude of the Doppler shift depends on the relative velocity between the wireless communication equipment and the base station's antenna. Given an angle, α, between a first vector representing the trajectory of the aircraft in Euclidean three-dimensional space and a second vector (also in Euclidean three-dimensional space) between the aircraft and the base station antenna, there will be an abrupt change of sign of the Doppler shift when the aircraft passes the transmitting antenna.

The Doppler shift can be expressed as $$\Delta f = f \left( \sqrt{\frac{1 - \frac{v}{c}}{1 + \frac{v}{c}}} - 1 \right)$$

where c is the speed of light and v is the relative velocity of the wireless communication equipment (essentially the same as the velocity of the aircraft) towards the base station antenna. With an angle α as discussed above and wireless communication equipment velocity, $v_{Wireless}$, the relative velocity towards the transmitting antenna giving rise to Doppler shift is $v = v_{Wireless} \cos \alpha$.

Accordingly in another aspect, since the base station also knows the aircraft's velocity relative to the base station, it can pre-compensate for Doppler shift beforehand in the downlink transmissions, such that the wireless communication equipment experiences the nominal carrier frequency when receiving the downlink signals. Similarly, the base station can calculate beforehand which Doppler shift it will experience in the transmission received from the airborne wireless communication equipment on the uplink, and hence can compensate for it in received signals without first having to detect the Doppler shift from the received signal, although such embodiments are not precluded. Hence Doppler shift compensation is not needed by the wireless communication equipment onboard the aircraft, although such embodiments are not precluded.

As mentioned earlier, the aircraft's movement makes it necessary from time to time to handover responsibility of a connection from a serving base station to another, and this raises the question of how to select a best-suited target base station/cell. In the environment discussed above, there could be several candidates having approximately the same effective distance to the aircraft. It is observed that the macro base station grid is designed for ground coverage, taking into account the variation in topology. However, for communication with aircraft in the sky, several of the macro BS/cells have approximately the same LoS distance to the aircraft, and hence conventional techniques for selecting one of these to serve as a target cell for handover are, in many instances, ineffective. Accordingly, a number of embodiments for selecting a suitable target base station/cell will now be described.

An aspect of embodiments consistent with the invention is technology configured to minimize, to the extent possible given a set of candidate target base stations/cells, a predicted level of beam distortion through the handover that can result from a number of situations.

This aspect of embodiments will now be described with reference to FIG. 6, which in one respect is a flow chart of steps/processes performed by circuitry in accordance with some but not necessarily all exemplary embodiments consistent with the invention. In another respect, FIG. 6 can be considered to depict exemplary means 600 comprising the various illustrated circuitry (e.g., hard-wired and/or suitably programmed processor) configured to perform the described functions.

Figure 6:
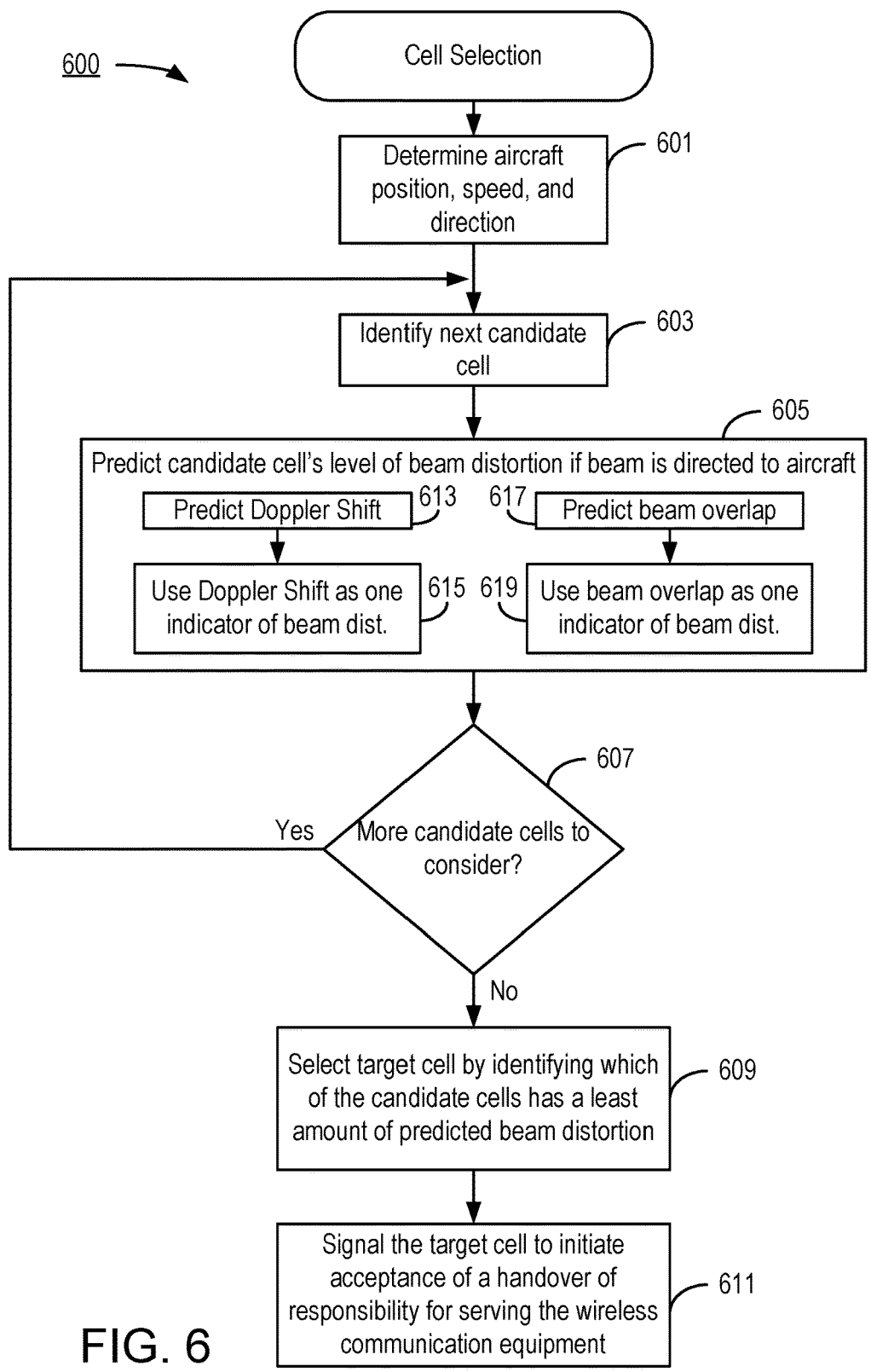
FIG. 6 depicts, in one respect, a flow chart of steps/processes performed by circuitry in accordance with some but not necessarily all exemplary embodiments consistent with the invention

The functionality illustrated in FIG. 6 is performed by circuitry in a network node of a terrestrial cellular telecommunications system, and is for facilitating a handover of responsibility for serving a wireless communication equipment from a serving cell to a target cell in a cellular telecommunications system, wherein the wireless communication equipment is situated in a first aircraft that is in-flight. This involves determining an aircraft position, an aircraft speed, and an aircraft direction (step 601). Various embodiments rely on a correspondence between the aircraft's position, speed and direction and that of the wireless communication equipment whose service is to be handed over.

The technology considers a number of candidate cells as potential target cells. A pool of candidate cells can be assembled in a number of ways. In one embodiment, the network receives measurement reports from one or more UEs, and candidate cells are the ones having sufficiently high Received Signal Code Power (RSCP) (e.g., 10 dB or more above the receiver sensitivity level is sufficient even if the serving cell is 10-20 dB stronger). In another embodiment the network node estimates RSCP based on the position of the aircraft and the network node position and use of knowledge of carrier frequency and LoS path loss estimation.

Accordingly, one of the candidate cells is identified (step 603), and a prediction is made regarding a level of beam distortion through the handover that would result from a beam directed from the candidate cell to the first aircraft (step 605).

If there are more candidate cells to consider (YES path out of decision block 607), then another one of the candidate cells is identified (step 603) and the processing continues as described.

When there are no more candidate cells to consider (NO path out of decision block 607), the target cell is selected from the plurality of candidate cells by identifying which of the plurality of candidate cells has a least amount of predicted beam distortion through the handover (609). What is herein referred to as "beam distortion through the handover" can arise from a number of situations, some of which are discussed further below for purposes of illustration and without limiting the scope of the technology. More generally, "beam distortion through the handover" refers to a deviation from an ideal performance that would result from theoretically perfect beams being directed at the aircraft through a handover.

Having identified which of the candidate cells will be the target cell, the network node signals the target cell to prepare for a handover of responsibility for serving the wireless communication equipment (step 611).

In some embodiments consistent with the invention, predicting the level of beam distortion that would result from a beam directed from a candidate cell to the first aircraft includes consideration of Doppler frequency shift. This is further illustrated in FIG. 6, which shows that this involves predicting a level of Doppler frequency shift that would result from the beam directed from the candidate cell to the first aircraft (step 613). The predicted level of Doppler frequency shift is then used as an indicator of the level of beam distortion that would result from the beam directed from the candidate cell to the first aircraft (step 615). It will be understood that consideration of Doppler effects in this manner can be used alone or alternatively in conjunction with consideration of other indicators of beam distortion.

Figure 7A:
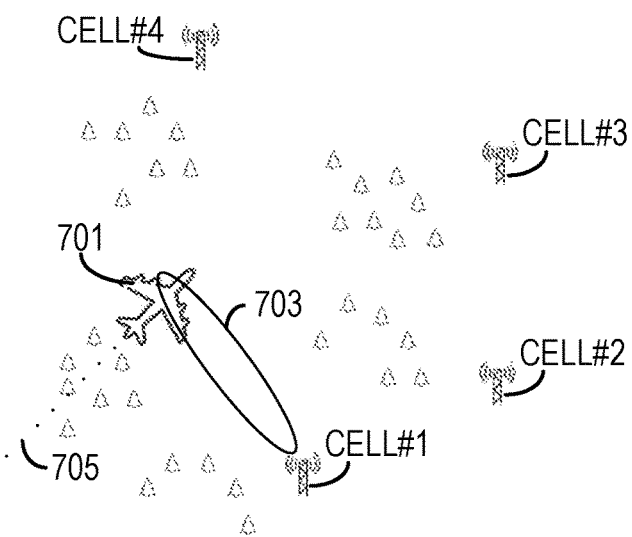
FIGS. 7A, 7B, and 7C illustrate an aspect of embodiments in which cells are selected based on an ability direct a beam substantially normal to the direction of an aircraft.
Figure 7B:
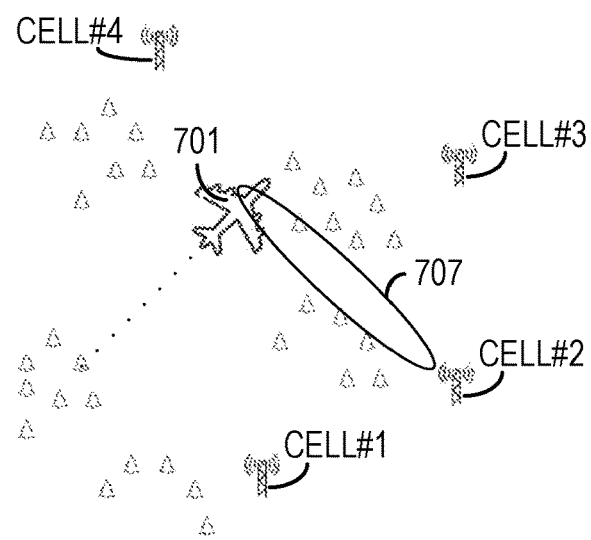
Figure 7C:
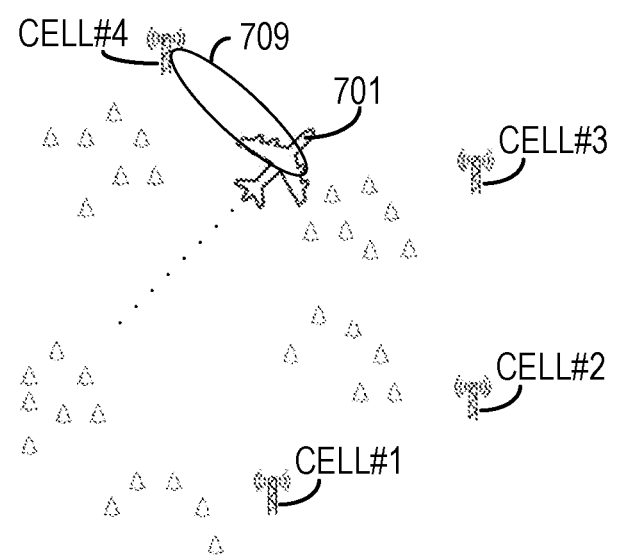

One way of identifying which of a number of candidate cells has the least amount of predicted beam distortion related to Doppler shift through a handover and making target cell selection on this basis is to determine which of the candidate cells would create a beam that is closest to being normal (orthogonal) to the aircraft's direction. The purpose here is to reduce the Doppler effects as much as possible. This aspect of the technology is illustrated in FIGS. 7A, 7B, and 7C which each depict an aerial view of an aircraft 701 as it flies over a geographic area that is populated with candidate base stations/cells identified as CELL#1, CELL#2, CELL#3, and CELL#4. In FIG. 7A, CELL#1 is shown as being the cell whose beam 703 most closely approximates a normal to the aircraft's direction 705. A little while later, as shown in FIG. 7B, a handover is made to CELL#2, whose beam 707 is now the most normal. Still later, as shown in FIG. 7C, another handover takes place to target cell CELL#4, again because its beam 709 is most normal to the aircraft 701.

Figure 8A:
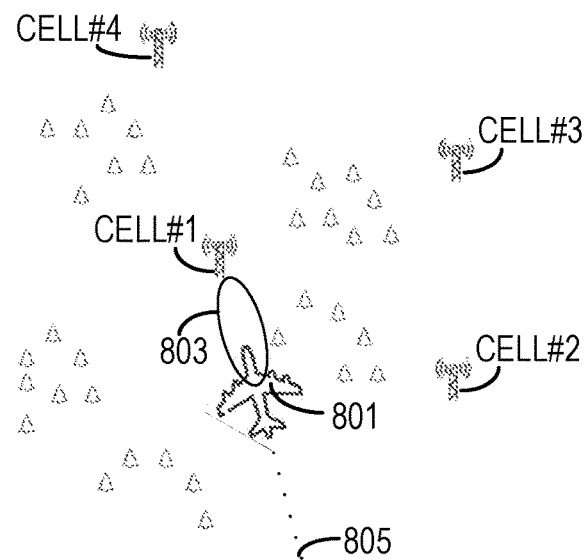
FIGS. 8A and 8B illustrate an aspect of embodiments in which cells are selected based on an ability to direct a beam substantially tangential to the direction of an aircraft.
Figure 8B:
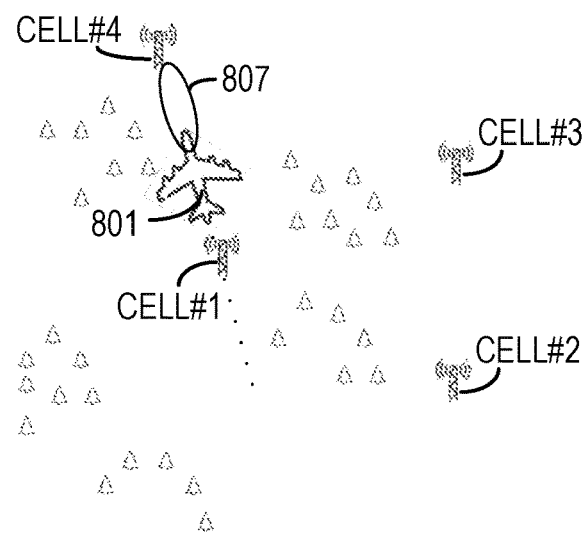

In some instances, it may not be possible to substantially reduce Doppler shift merely by cell selection. In such cases, beam distortion can be considered not only in absolute terms, but also relative to present circumstances: how much will the Doppler shift change as service is handed over from a present serving cell to a target cell. Accordingly, a most suitable target cell can be considered one that to the greatest extent possible, stabilizes Doppler shift through the handover. This can be achieved by, for example, determining which of the candidate cells would create a beam that is closest to being tangential to the first aircraft direction. This aspect of the technology is illustrated in FIGS. 8A and 8B, which each depict an aerial view of an aircraft 801 as it flies over a geographic area that is populated with candidate base stations/cells again identified as CELL#1, CELL#2, CELL#3, and CELL#4. In FIG. 8A, CELL#1 is shown as being the cell whose beam 803 most closely approximates being tangential to the aircraft's direction 805. It can be predicted that the aircraft 801, presently heading toward CELL#1, will soon pass over CELL#1, which means that its positive Doppler shift will abruptly switch to negative. Therefore, just before this occurs, a handover is made to CELL#4, which, as shown in FIG. 8B, has a beam 807 that is again tangential to the direction of the aircraft 801 while maintaining (stabilizing) the positive Doppler shift (i.e., because the aircraft 801 is heading toward CELL#4).

In still other circumstances, stabilizing changes in Doppler shift through the handover can be achieved by maintaining a consistent angle to the flight track. Since maintain the beam as normal to the aircraft's direction and maintaining the beam as tangential to the aircraft's direction are special cases of maintaining a consistent angle, FIGS. 7A, 7B, 7C, 8A, and 8B can be considered to be illustrations of this aspect as well.

In still other aspects, beam distortion through a handover includes a consideration of how several beams make interact with each other and/or on network elements. In such embodiments, any one or combination of the following can be performed:
  Select sites in such fashion that the beams to different aircraft served by a same network node have different azimuths and/or directions.
  Select sites based on utilization; if one network node is operating close to full capacity with respect to, for example:
    Number of active beams/served airplanes
    Baseband processing
    Backhaul capacity then offload to and/or select another network node to serve an aircraft that enters the covered airspace.
  Select sites in such fashion that avoids having their beams unintentionally covering aircraft other than the intended aircraft, including avoiding selection of a candidate node if it is predicted that another (unintended) aircraft (potentially served by a different site) will at some point be coming into the coverage of a beam from that candidate node.
  Select sites based on interference conditions (directly and indirectly from side- and backlobes). This can be done by considering:
    Serving cell measurements (e.g., Reference Signal Received Quality-RSRQ—, Channel Quality Index—CQI—, Reference Signal-Signal to Interference and Noise Ratio—RS-SINR)
    Direct calculations/predictions from a network node (not necessarily any of the ones engaged in communication with aircraft)

Figure 9A:
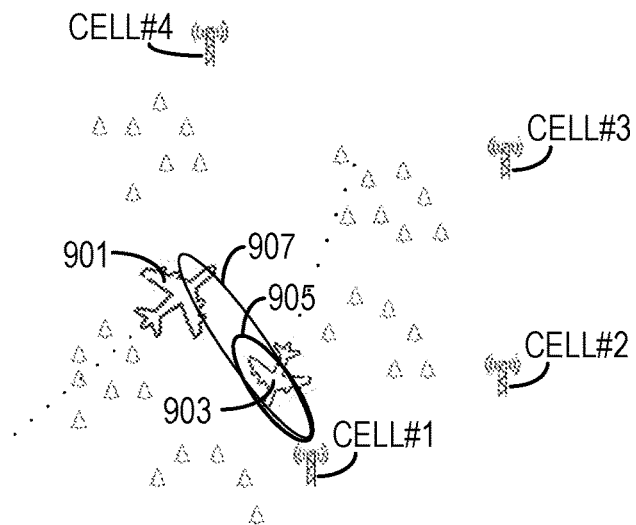
FIGS. 9A and 9B illustrate an aspect of embodiments in which either a same cell or separate cells are selected based on overlap between beams serving different aircraft.

To further illustrate this aspect of various embodiments, FIG. 9A depicts an aerial view of a first aircraft 901 and a second aircraft 903 as they fly over a geographic area that is populated with candidate base stations/cells again identified as CELL#1, CELL#2, CELL#3, and CELL#4. In FIG. 9A, the azimuths from respective beams 905 and 907 differ significantly from one another. Consequently, despite the apparent proximity of the first and second aircraft 901, 903 and the fact that they are in the same general direction from the network node, they may both be served by the same network node, in this example, CELL#1.

Figure 9B:
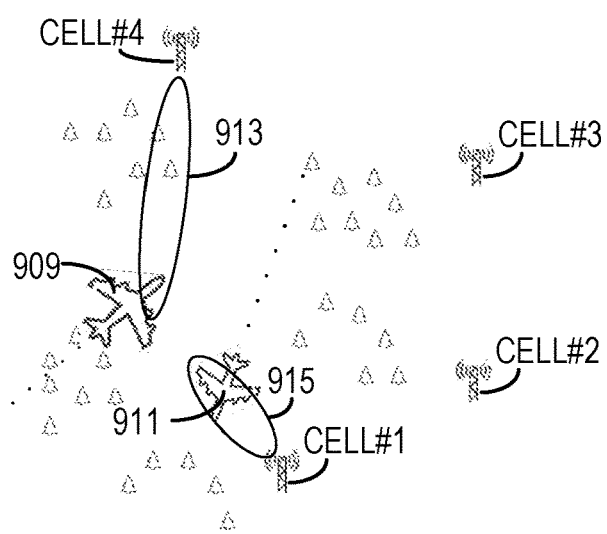

By contrast, FIG. 9b depicts an aerial view of a first aircraft 909 and a second aircraft 911 as they fly over a geographic area that is populated with candidate base stations/cells again identified as CELL#1, CELL#2, CELL#3, and CELL#4. In this case, the first and second aircraft 909, 911 are not only in the same direction from the network node CELL#1, but also the azimuths of beams that would be generated to serve them both are substantially the same (i.e., within some predefined level of tolerance). Thus, in this case the two aircraft need to be served by two different nodes: in this example, the first aircraft 909 is served by a beam 913 from network node CELL#4, and the second aircraft 911 is served by a beam 915 from network node CELL#1.

Figure 10:
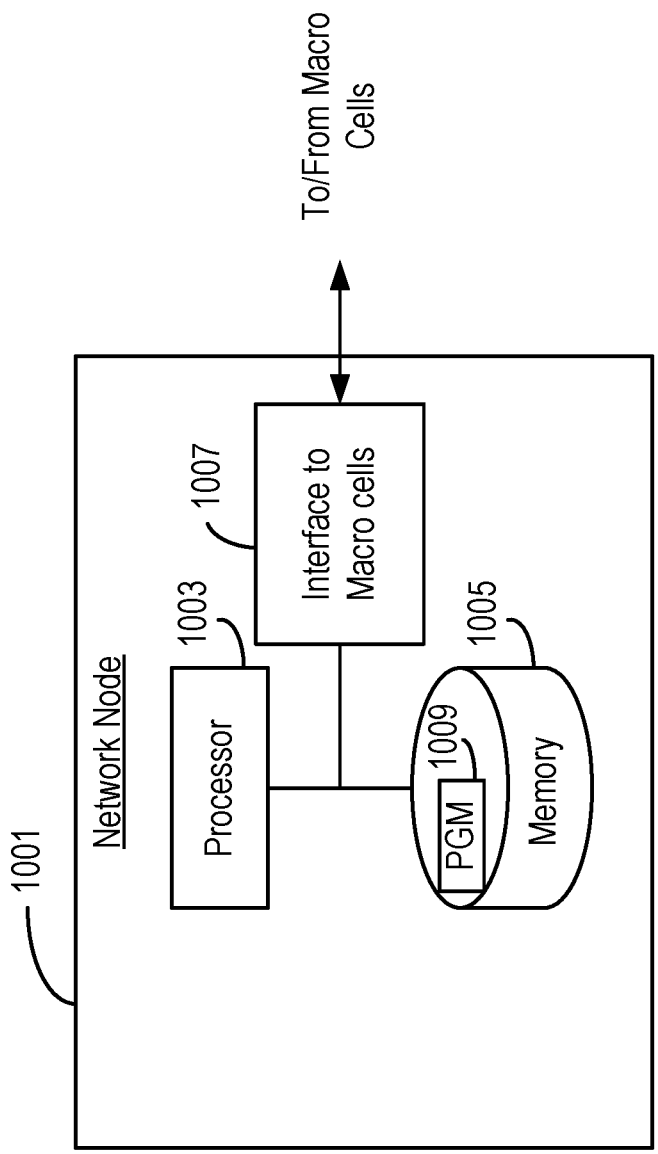
FIG. 10 is a block diagram of elements for carrying out various aspects of the invention.

Looking at further aspects of embodiments consistent with the invention, FIG. 10 is a block diagram of elements for carrying out various aspects of the invention as described above, such as in connection with FIGS. 6, 7A, 7B, 7C, 8A, 8B, 9A, and 9B. In particular, a network node 1001 (e.g., an eNB or other node configured to be capable of carrying out the functionality described above) includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 10, however, is programmable circuitry, comprising a processor 1003 coupled to one or more memory devices 1005 (e.g., Random Access Memory, Magnetic Disc Drives, Optical Disk Drives, Read Only Memory, etc.) and to a network interface 1007 that enables bidirectional communication with other nodes in the telecommunications system, such as but not limited to various candidate base stations/cells. The memory device(s) 1005 store program means 1009 (e.g., a set of processor instructions) configured to cause the processor 1003 to control other node elements so as to carry out any of the aspects described above, such as but not limited to those described with reference to FIGS. 6, 7A, 7B, 7C, 8A, 8B, 9A, and 9B. The memory device(s) 1005 may also store data (not shown) representing various constant and variable parameters as may be needed by the processor 1003 and/or as may be generated when carrying out its functions such as those specified by the program means 1009.

It can be seen that the technology described herein is able to optimize cell selection when serving mobile communication in the sky, and is able to make better use of spectrum and to improve quality of service.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of handing over responsibility for serving a wireless communication equipment from a serving cell to a target cell in a cellular telecommunications system, wherein the wireless communication equipment is situated in a first aircraft that is in-flight, wherein the method is performed by a network node of the cellular telecommunications system, the method comprising:
   determining an aircraft position, an aircraft velocity, and an aircraft direction for the first aircraft;
   for each candidate cell of a plurality of candidate cells, using at least one of the aircraft position, the aircraft velocity, and the aircraft direction to predict a level of Doppler shift that would result from a beam directed from the candidate cell to the first aircraft;
   selecting the target cell from the plurality of candidate cells by identifying which of the plurality of candidate cells minimizes an amount of change between the predicted Doppler shift and a present Doppler shift through a candidate handover from the serving cell to the candidate cell, and selecting the identified candidate cell as the target cell, wherein the present Doppler shift results from a beam directed from the serving cell to the first aircraft; and
   signaling the target cell to prepare for a handover of responsibility for serving the wireless communication equipment.

2. The method of claim 1, wherein determining the aircraft position, the aircraft velocity, and the aircraft direction comprises:
   periodically acquiring, via an aircraft navigation broadcast receiver, acquired navigation information transmitted from the first aircraft, wherein the acquired navigation information comprises:
     the position of the first aircraft;
     an altitude of the first aircraft; and
     a time value indicating when the position of the first aircraft was determined; and
   determining the velocity and the direction from the periodically acquired navigation information.

3. A method of handing over responsibility for serving a wireless communication equipment from a serving cell to a target cell in a cellular telecommunications system, wherein the wireless communication equipment is situated in a first aircraft that is in-flight, wherein the method is performed by a network node of the cellular telecommunications system, the method comprising:
   determining an aircraft position, an aircraft velocity, and an aircraft direction for the first aircraft;
   for each candidate cell of a plurality of candidate cells, predicting a level of beam distortion through a handover that would result from a beam directed from the candidate cell to the first aircraft;
   selecting the target cell from the plurality of candidate cells by identifying which of the plurality of candidate cells has a least amount of predicted beam distortion through the handover; and
   signaling the target cell to prepare for a handover of responsibility for serving the wireless communication equipment,
   wherein predicting the level of beam distortion through the handover that would result from the beam directed from the candidate cell to the first aircraft comprises:
   predicting for a given future moment in time, an azimuth and direction of a beam from the candidate cell to the first aircraft;
   predicting for the given future moment in time, an azimuth and direction of a beam from the candidate cell to a second aircraft having onboard wireless communication equipment in need of cellular communication system service;
   determining a degree of similarity between the predicted azimuth and direction of the beam from the candidate cell to the first aircraft and the predicted azimuth and direction of the beam from the candidate cell to the second aircraft; and
   using the degree of similarity as an indicator of the level of beam distortion.

4. An apparatus for handing over responsibility for serving a wireless communication equipment from a serving cell to a target cell in a cellular telecommunications system, wherein the wireless communication equipment is situated in a first aircraft that is in-flight, wherein the apparatus is associated with a network node of the cellular telecommunications system, the apparatus comprising:
   circuitry configured to determine an aircraft position, an aircraft velocity, and an aircraft direction for the first aircraft;
   circuitry configured to use at least one of the aircraft position, the aircraft velocity, and the aircraft direction to predict, for each candidate cell of a plurality of candidate cells, a level of Doppler shift that would result from a beam directed from the candidate cell to the first aircraft;
   circuitry configured to select the target cell from the plurality of candidate cells by identifying which of the plurality of candidate cells minimizes an amount of change between the predicted Doppler shift and a present Doppler shift through a candidate handover from the serving cell to the candidate cell, and selecting the identified candidate cell as the target cell, wherein the present Doppler shift results from a beam directed from the serving cell to the first aircraft; and
   circuitry configured to signal the target cell to prepare for a handover of responsibility for serving the wireless communication equipment.

5. The apparatus of claim 4, wherein the circuitry configured to determine the aircraft position, the aircraft velocity, and the aircraft direction comprises:
   circuitry configured to periodically acquire, via an aircraft navigation broadcast receiver, acquired navigation information transmitted from the first aircraft, wherein the acquired navigation information comprises:
the position of the first aircraft;
an altitude of the first aircraft; and
a time value indicating when the position of the first aircraft was determined; and
circuitry configured to determine the velocity and the direction from the periodically acquired navigation information.

6. An apparatus for handing over responsibility for serving a wireless communication equipment from a serving cell to a target cell in a cellular telecommunications system, wherein the wireless communication equipment is situated in a first aircraft that is in-flight, wherein the apparatus is associated with a network node of the cellular telecommunications system, the apparatus comprising:
circuitry configured to determine an aircraft position, an aircraft velocity, and an aircraft direction for the first aircraft;
circuitry configured to predict, for each candidate cell of a plurality of candidate cells, a level of beam distortion through a handover that would result from a beam directed from the candidate cell to the first aircraft;
circuitry configured to select the target cell from the plurality of candidate cells by identifying which of the plurality of candidate cells has a least amount of predicted beam distortion through the handover; and
circuitry configured to signal the target cell to prepare for a handover of responsibility for serving the wireless communication equipment,
wherein the circuitry configured to predict the level of beam distortion through the handover that would result from the beam directed from the candidate cell to the first aircraft comprises:
circuitry configured to predict for a given future moment in time, an azimuth and direction of a beam from the candidate cell to the first aircraft;
circuitry configured to predict for the given future moment in time, an azimuth and direction of a beam from the candidate cell to a second aircraft having onboard wireless communication equipment in need of cellular communication system service;
circuitry configured to determine a degree of similarity between the predicted azimuth and direction of the beam from the candidate cell to the first aircraft and the predicted azimuth and direction of the beam from the candidate cell to the second aircraft; and
circuitry configured to use the degree of similarity as an indicator of the level of beam distortion.

7. A nontransitory computer readable storage medium comprising program instructions that, when performed by one or more processors of a network node of a cellular telecommunications system, cause the network node to perform a method of handing over responsibility for serving a wireless communication equipment from a serving cell to a target cell in the cellular telecommunications system, wherein the wireless communication equipment is situated in a first aircraft that is in-flight, and wherein the method comprises:
determining an aircraft position, an aircraft velocity, and an aircraft direction for the first aircraft;
for each candidate cell of a plurality of candidate cells, using at least one of the aircraft position, the aircraft velocity, and the aircraft direction to predict a level of Doppler shift that would result from a beam directed from the candidate cell to the first aircraft;
selecting the target cell from the plurality of candidate cells by identifying which of the plurality of candidate cells minimizes an amount of change between the predicted Doppler shift and a present Doppler shift through a candidate handover from the serving cell to the candidate cell, wherein the present Doppler shift results from a beam directed from the serving cell to the first aircraft; and
signaling the target cell to prepare for a handover of responsibility for serving the wireless communication equipment.

8. A method of handing over responsibility for serving a wireless communication equipment from a serving cell to a target cell in a cellular telecommunications system, wherein the wireless communication equipment is situated in a first aircraft that is in-flight, wherein the method is performed by a network node of the cellular telecommunications system, the method comprising:
determining an aircraft position, an aircraft velocity, and an aircraft direction for the first aircraft;
for each candidate cell of a plurality of candidate cells, using at least one of the aircraft position, the aircraft velocity, and the aircraft direction to predict for a given future moment in time, a beam angle between a first vector representing the trajectory of the first aircraft and a second vector between the first aircraft and a candidate cell antenna, wherein the first and second vectors are vectors in a Euclidean three-dimensional space; and
selecting the target cell from the plurality of candidate cells by identifying which of the plurality of candidate cells minimizes an amount of change between the predicted beam angle and a present beam angle, and selecting the identified candidate cell as the target cell, wherein the present beam angle is between the first vector and a third vector between the first aircraft and a serving cell antenna; and
signaling the target cell to prepare for a handover of responsibility for serving the wireless communication equipment.

9. The method of claim 8, wherein:
selecting the target cell from the plurality of candidate cells comprises:
identifying which of the candidate cells has the beam angle that is closest to being normal to the first aircraft direction.

10. The method of claim 8, wherein:
selecting the target cell from the plurality of candidate cells comprises:
identifying which of the candidate cells has the beam angle that is closest to being tangential to the first aircraft direction.

11. The method of claim 8, comprising:
predicting for the given future moment in time, a first angle between the first vector representing the trajectory of the first aircraft and the third vector between the first aircraft and the serving cell antenna, wherein the third vector is a vector in the Euclidean three-dimensional space; and
wherein:
selecting the target cell from the plurality of candidate cells comprises:
identifying which of the candidate cells has the beam angle that is most like the first angle.

12. An apparatus for handing over responsibility for serving a wireless communication equipment from a serving cell to a target cell in a cellular telecommunications system, wherein the wireless communication equipment is situated in a first aircraft that is in-flight, wherein the apparatus is associated with a network node of the cellular telecommunications system, the apparatus comprising:
- circuitry configured to determine an aircraft position, an aircraft velocity, and an aircraft direction for the first aircraft;
- circuitry configured to use at least one of the aircraft position, the aircraft velocity, and the aircraft direction, to predict for each candidate cell of a plurality of candidate cells, for a given future moment in time, a beam angle between a first vector representing the trajectory of the first aircraft and a second vector between the first aircraft and a candidate cell antenna, wherein the first and second vectors are vectors in a Euclidean three-dimensional space; and
- circuitry configured to select the target cell from the plurality of candidate cells by identifying which of the plurality of candidate cells minimizes an amount of change between the predicted beam angle and a present beam angle, and select the identified candidate cell as the target cell, wherein the present beam angle is between the first vector and a third vector between the first aircraft and a serving cell antenna; and
- circuitry configured to signal the target cell to prepare for a handover of responsibility for serving the wireless communication equipment.

13. The apparatus of claim 12, wherein:
the circuitry configured to select the target cell from the plurality of candidate cells comprises:
circuitry configured to identify which of the candidate cells has the beam angle that is closest to being normal to the first aircraft direction.

14. The apparatus of claim 12, wherein:
the circuitry configured to select the target cell from the plurality of candidate cells comprises:
circuitry configured to identify which of the candidate cells has the beam angle that is closest to being tangential to the first aircraft direction.

15. The apparatus of claim 12, comprising:
circuitry configured to predict for the given future moment in time, a first angle between the first vector representing the trajectory of the first aircraft and the third vector between the first aircraft and the serving cell antenna, wherein the third vector is a vector in the Euclidean three-dimensional space; and
wherein:
the circuitry configured to select the target cell from the plurality of candidate cells comprises:
circuitry configured to identify which of the plurality of candidate cells has the beam angle that is most like the first angle.

* * * * *